United States Patent Office 3,551,290
Patented Dec. 29, 1970

3,551,290
LIQUID PRESERVATIVE FOR CORNEAL GRAFTS, ITS METHOD OF PREPARATION AND USE
Yasuharu Kuwahara and Michio Sakanoue, Tokyo, Japan, assignors to Yasyharu Kuwahara, Tokyo, Japan
No Drawing. Filed Aug. 23, 1965, Ser. No. 481,923
Claims priority, application Japan, Aug. 22, 1964, 39/47,657
Int. Cl. A01n 1/02
U.S. Cl. 195—1.7                                    3 Claims

ABSTRACT OF THE DISCLOSURE

A liquid preservative is provided for corneal grafts, which comprises an artificial aqueous humor, vitamin C, and an acidic mucopolysaccharide such as the sodium and potassium salts of each of keratosulfate, chondroitin sulfate A and chondroitin sulfate C. The acidic mucopolysaccharide and vitamin C are present in amounts of 0.75 to 1.25 parts by weight and 0.02 to 0.2 part by weight, respectively, per 100 parts by volume of the artificial aqueous humor.

---

This invention relates to the preservation of corneal grafts including human and animal corneal grafts. More particularly, this invention is concerned with a liquid formulation useful for the preservation of donor eyes, and the preparation of said liquid formulation.

In the prior art, several methods have been made to effect the preservation of a donor eye. Fixation with formalin and immersion in liquid paraffin or blood serum are well known. Freezing or freeze-drying of eye balls, as well as storage of eye balls in a moist chamber, also has been proposed. All these methods, however, are not satisfactory. For instance, the probability of success in transplantation of corneal grafts which have been stored at 4° C. in a moist chamber is found to be approximately 10/23. Where corneal grafts stored at 4° C. in liquid paraffin are used for transplantation, the probability of success is approximately 24/46. Freezing which has been considered somewhat promising up to the present is also unsatisfactory because it causes undesired penetration of aqueous humor through the corneal endothelium to the parenchyma until the cornea become cloudy. Further, this method unavoidably suffers from swelling and opacification of the vacuum-dried cornea when it is regenerated. In order to remove the physical disadvantages accompanying the freezing method, it has been proposed to carry out freezing stepwise in glycerine or gelatine medium. However, such proposal is useless if the maintenance of viability of the corneal tissue is a problem.

We have noted that although the prior art techniques might be somewhat satisfactory for the preservation of corneal grafts to be used in lamellar keratoplasty, they are entirely useless to preserve corneal grafts to be used in penetrating keratoplasty. Further, we have noted that the prior art techniques mainly deal with physical dehydration of the cornea (as in freeze-drying or glycerine treatment) or with physical insulation of water (as in storage in various oils). If successful corneal transplantation, not only in lamellar keratoplasty but also in penetrating keratoplasty is desired, it is essential to maintain the viability of the corneal tissues at the required level. To realize this, consideration has been paid to the investigation of the physiological condition of the living eye ball. After extensive studies, we have found that a liquid preservative for corneal grafts can be obtained by addition of a cetrain macromolecular substance and vitamin C (1-ascorbic acid) to a liquid formulation which may be considered as a liquid model of a cornea. For convenience, such liquid formulation as indicated just before will be referred as an artificial aqueous humor hereafter.

It is accordingly one object of the present invention to provide a new liquid formulation which is useful as a preservative of human and animal eye balls. Another object of the present invention is to provide a liquid preservative which is useful for preservation of corneas to be used in corneal transplantation including both lamellar keratoplasty and penetrating keratoplasty. Other objects, features and advantages comprehended by the invention will become apparent as the description proceeds.

In accordance with the present invention, there is provided a liquid formulation useful for the preservation of a donor eye, which comprises an artificial aqueous humor, mixed with 0.75–1.25 w./v. percent of an acidic mucopolysaccharide and 0.02–0.2 w./v. percent of vitamin C.

Suitable acidic mucopolysaccharides which are usable in the present invention include the sodium and potassium salts of keratosulfate, chondroitin sulfate A and chondroitin sulfate C. Unexpectedly it has been found that the respective calcium salts which also are the alkali metal salts are not effective for the purpose of the present invention. Addition of such suitable mucopolysaccharides enables the maintenance of the activity of corneal cells while preventing the swelling of the cornea so that it may be kept transparent. The amount of acidic mucopolysaccharides added will vary within the range of from about 0.75 to about 1.25 g., preferably about 1.0 g., per 100 ml. of the artificial aqueous humor.

Vitamin C which is added together with acidic mucopolysaccharide usually will be in an amount of from about 0.02 to about 0.2 g., preferably about 0.1 g., per 100 ml. of the artificial aqueous humor. The use of vitamin C in the liquid formulation of the present invention is not only useful for stable preservation of corneas, but is also effective to accelerate the cure of trauma which may occur during transplantation.

A liquid formulation which is prepared by adding both an acidic mucopolysaccharide and vitamin C to an artificial aqueous humor according to the invention is far more effective in the preservation of corneal grafts than is the control to which the above-indicated two components have not been added. For example, whereas Ringer's solution per se can be effective for the preservation of corneal grafts only for a very short time, say one or two hours, Ringer's solution mixed with a mucopolysaccharide and vitamin C is capable of preserving corneal grafts for 8 to 10 hours, with a good result of transplantation. When such a solution as having the later-specified composition is adopted as an artificial aqueous humor in combination with the above-indicated two components, it allows for the successful preservation of corneal grafts for over seven days. At present, ophthalmologists who have concern with corneal transplantation set the goal at preservation of corneas for seven days, since the indicated period is sufficiently long to make it possible to transport a donor eye from one place to another. Accordingly, the present invention is epoch making in view of the realization of the seven days' preservation of donor eyes. Another great advantage of the present invention is that cornea stored by using a liquid formulation of the invention allows one to have a probability of success as high as 95% in penetrating keratoplasty, while that stored by any one of the prior methods assures the probability of success of only 50% or less.

The term "artificial aqueous humor" used herein is to be understood as meaning any liquid having a composition which may be considered as a liquid model of the eye ball. Such a liquid may be the known aqueous humor substitutes, which are occasionally used in various physiological tests. Accordingly, Ringer's solution which we referred to above also is an artificial aqueous humor usable in this invention. After thorough studies of the physico-chemical properties of natural aqueous humor, however, it has been found that the most successful preservation of donor eye according to the invention can be obtained by using, as an artificial aqueous humor, an aqueous solution defined below:

| Component: | Strength, mM./l. |
|---|---|
| $Na^+$ | 129–157 |
| $K^+$ | 3.5–3.7 |
| $Ca^{++}$ | 1.12–1.18 |
| $Mg^{++}$ | 1.16–1.24 |
| $Cl^-$ | 121.6–129.2 |
| $PO_4^{---}$ | 0.485–0.515 |
| $SO_4^{--}$ | 1.16–1.24 |
| $HCO_3$ | 21.9–23.3 |
| Glucose | 5–20 |
| Alkali metal salt of 1-glutamic acid | 0.25–0.5 | wherein mM. represents millimoles

The above solution may be prepared as follows: Suitable electrolytes which are capable of providing the respective ion components, i.e. sodium chloride, potassium chloride, calcium chloride, potassium dihydrogen phosphate, sodium hydrogen carbonate, potassium hydrogen carbonate, magnesium sulfate, sodium sulfate, etc., are dissolved in appropriate amounts into re-distilled sterile water, and then glucose and alkali metal 1-glutamate, e.g. sodium or potassium 1-glutamate, are added to the resulting solution. Care should be taken in the sequence of addition of the individual components in order to avoid the possible formation of any precipitate. Blowing of carbon dioxide gas is preferable for this purpose. Although the exact roles of the individual components are not fully clear, it is assumed that the glucose serves as an energy source and alkali metal 1-glutamate serves as an ion-carrier for corneal cells. Preferable as alkali metal 1-glutamate is sodium 1-glutamate because of its good solubility in water.

The aqueous mixed salt solution thus obtained has an approximately equal composition to that of human aqueous humor and it is very useful for the purpose of the present invention. Besides the specified components, natural human aqueous humor further contains 1-aspargic acid, 1-cystein and lower molecular proteins. These materials may be added to the said mixed salt solution if the osmolarity of the solution is not influenced thereby.

The following examples describe certain ways in which the principle of the invention has been applied, but are not to be construed as limiting its scope.

EXAMPLE 1

14.03 g. of sodium chloride, 3.865 g. of sodium bicarbonate, 0.462 g. of potassium chloride and 0.136 g. of potassium dihydrogen phosphate are dissolved into 2000 ml. of re-distilled sterile water at room temperature. Into the resulting solution, 100% $CO_2$ gas is blown until saturation. To the $CO_2$-saturated solution, 0.339 g. of $CaCl_2 \cdot 2H_2O$ and 0.592 g. of $MgSO_4 \cdot 7H_2O$ are added portionwise. Then the solution (2 l.) is added with 3.6 g. of glucose and 73.6 mg. of sodium 1-glutamate at room temperature. The resulting clear solution has the following physico-chemical properties:

| Ion: | Strength, mM./l. |
|---|---|
| $Na^+$ | 143 |
| $K^+$ | 3.6 |
| $Ca^{++}$ | 1.15 |
| $Mg^{++}$ | 1.2 |
| $Cl^-$ | 125.4 |
| $HCO_3^{--}$ | 22.6 |
| $PO_4^{---}$ | 0.5 |
| $SO_4^{--}$ | 1.2 |

Osmolarity: 309.

The solution (2 l.) thus prepared is added with 20 g. of sodium keratosulfate (1.0 w./v. percent) and 2.0 g. of vitamin C (0.1 w./v. percent). The resulting clear solution has a pH of 7.4 under the respiratory metabolism with 5% $CO_2$ plus 95% $O_2$. It can be stored in a plastic bottle (polyethylene-made) at 0° C. under aseptic conditions.

A cornea, together with a part of its pleura, is cut from a human eye ball extracted six hours after death. The cornea is then immersed in the above-prepared liquid preservative in the amount of about 50 ml. per eye ball. After storage in an ice box at 0° C. for seven days, this cornea is used in penetrating keratoplasy. The transplanted cornea does not show cloudiness six months after operation. Viability of the corneal cells also is found to be normal by inspection of oxygen consumption or tissue culture.

EXAMPLE 2

The same procedures as of Example 1 are repeated except that the sodium keratosulfate used in Example 1 is substituted by an equal amount of sodium chondroitin sulfate A. The maximum period for preservation of a monkey eye ball in this liquid preservative is ten days during which period corneal transplantation in penetrating keratoplasty can be made with successful results.

EXAMPLE 3

The same procedures as of Example 1 are repeated except for that sodium keratosulfate used in Example 1 is substituted with the equal amount of sodium chondroitin sulfate C or potassium chondroitin sulfate A. In the resulting two clear solutions, one of which contains sodium chondroitin sulfate C and the other does potassium chondroitin sulfate A, human eye balls are preserved at 0° C. for seven days. At the end of that period, microscopic observation of the eye balls shows that no detrimental change occurs in their corneal structures.

What we claim is:

1. A liquid preservative for corneal grafts, which comprises an aqueous solution having a total osmolarity of 295 to 325 and an ion strength of 129–157 mM. as sodium ion, 3.5–3.7 mM. as potassium ion, 1.12–1.18 mM. as calcium ion, 1.16–1.24 mM. as magnesium ion, 121.6–129.2 mM. as chloride ion, 0.485–0.515 mM. as phosphate ion, 1.16–1.24 mM. as sulfate ion and 21.9–23.3 mM. as bicarbonate ion, said aqueous solution further containing 5–20 mM. of glucose and 0.25–0.5 mM. of sodium 1-glutamate per liter, wherein mM. represents millimoles in combination with 0.75–1.25 w./v. percent of an acidic mucopolysaccharide selected from the group consisting of the sodium and potassium salts of keratosulfate, chondroitin sulfate A and chondroitin sulfate C, and 0.02–0.2 w./v. percent of vitamin C.

2. A method for preparing the liquid preservative as claimed in claim 1, which comprises dissolving sodium chloride, sodium bicarbonate, potassium chloride and potassium dihydrogen phosphate in re-distilled sterile water, saturating the resulting solution with carbon dioxide gas, dissolving in the saturated solution calcium chloride and magnesium sulfate, adding glucose and 1-sodium glutamate to the resulting solution, and further adding thereto and acidic mucopolysaccharide and vitamin C.

3. A method for the long term preservation of corneal grafts comprising maintaining a corneal graft immersed in a preservative solution constituted by an artifical aqueous humor, an acidic mucopolysaccharide selected from the group consisting of the sodium and potassium salts of each of keratosulfate, chondroitin sulfate A and chondroitin sulfate C, and vitamin C, the preservative solution being present in an amount of about 50 ml. per eyeball and being maintained at a temperature of about 0° C. during the storage of the graft, said artifical aqueous humor being an aqueous solution having a total osmolarity of 295 to 325 and an ion strength of 129–157 mM. as sodium ion, 3.5–3.7 mM. as potassium ion, 1.12–1.18 mM., as calcium ion, 1.16–1.24 mM. as magnesium ion, 121.6–129.2 mM. as chloride ion, 0.485–0.515 mM. as phosphate ion, 1.16–1.24 mM. as sulfate ion and 21.9–23.3 mM. as bicarbonate ion, said aqueous solution containing 5–20 mM. of glucose and 0.25–0.5 mM. of sodium 1-glutamate per liter, wherein mM. represents millimoles.

References Cited

Kamijawa Chem. Absts. vol. 54, col. 13196–13197.
Pive Chem. Absts., vol. 40, col. 4130(8) (1946).
Webster's New International Dictionary 2nd Ed. (unabridged), p. 2151 (1940).

ALBERT T. MEYERS, Primary Examiner

V. D. TURNER, Assistant Examiner